United States Patent
Senf, Jr. et al.

(10) Patent No.: US 7,665,314 B2
(45) Date of Patent: Feb. 23, 2010

(54) INTERMODAL AIR COMPRESSOR WATER SEPARATOR AND HEAT EXCHANGER

(75) Inventors: Raymond L. Senf, Jr., Central Square, NY (US); Alan D. Abbott, Manlius, NY (US); Stephen Kenney, North Syracuse, NY (US)

(73) Assignee: Carrier Corporation, Farmington, CT (US)

( * ) Notice: Subject to any disclaimer, the term of this patent is extended or adjusted under 35 U.S.C. 154(b) by 627 days.

(21) Appl. No.: 11/263,043

(22) Filed: Oct. 31, 2005

(65) Prior Publication Data

US 2007/0095078 A1    May 3, 2007

(51) Int. Cl.
*F24F 3/16* (2006.01)
(52) U.S. Cl. .............................. 62/78; 62/93
(58) Field of Classification Search ...... 62/90, 62/92, 93, 176.5, 173, 228.4, 78
See application file for complete search history.

(56) References Cited

U.S. PATENT DOCUMENTS

| | | | |
|---|---|---|---|
| 3,867,115 A | 2/1975 | Heintzelman | |
| 4,920,756 A | 5/1990 | Howland et al. | |
| 4,976,109 A * | 12/1990 | Garrett | 62/642 |
| 5,127,233 A * | 7/1992 | Coffield | 62/78 |
| 5,457,963 A * | 10/1995 | Cahill-O'Brien et al. | 62/78 |
| 5,515,769 A | 5/1996 | Basinski et al. | |
| 5,974,815 A | 11/1999 | Hwang et al. | |
| 5,983,655 A | 11/1999 | Kistner et al. | |
| 6,092,430 A * | 7/2000 | Liston et al. | 73/863.81 |
| 6,431,060 B1 | 8/2002 | Gutheim | |
| 6,560,974 B2 * | 5/2003 | Kroll et al. | 62/78 |
| 6,895,774 B1 | 5/2005 | Ares et al. | |

* cited by examiner

*Primary Examiner*—William E Tapolcai
(74) *Attorney, Agent, or Firm*—Mariama Muldoon Blasiak & Sullivan LLP

(57) ABSTRACT

A refrigerated container having an air compressor for maintaining a controlled atmosphere includes provisions for cooling the ambient air being drawn in by the air compressor to thereby prevent corrosion in the air compressor. A condensing line heat exchanger is connected between an inlet port and the compressor and is so disposed that the evaporator fan passes air thereover to provide cooling to the ambient air passing therethrough such that condensation forms within the tube. A water separator is included in the system to remove condensate and allow the drier air to pass to the compressor. The water separator is so constructed as to allow for the free flow of air therethrough with very little restriction. A drain fitting in the water separator is so constructed as to prevent spattering that might otherwise occur.

16 Claims, 3 Drawing Sheets

INTERMODAL AIR COMPRESSOR WATER SEPARATOR AND HEAT EXCHANGER

BACKGROUND OF THE INVENTION

This invention relates generally to refrigerated containers with controlled atmosphere apparatus and, more particularly, to a method and apparatus for preventing the corrosion of an air compressor therein.

In cargo containers used for transporting food and other perishables it is necessary to maintain an oxygen poor atmosphere in order to prevent food spoilage, and to prevent damage from insects and similar vermin. Limiting the amount of oxygen in the container, while maintaining the internal temperature within a desired cool range inhibits metabolic processes within the food, and can eventually kill organisms that would attack valuable food cargo. In such containers the need to maximize payload volume limits the space that is available for refrigeration and environmental control equipment, including the system for maintaining the controlled internal atmosphere. This system typically includes an air compressor, heater, and filter that feeds a gas separator that discharges oxygen poor effluent into the chamber, and returns the remainder into the ambient. The gas separator is typically a semipermeable membrane. In order to conserve space, and to protect the system from a harsh marine environment it is standard practice to dispose its air compressor inside the container, within the controlled atmosphere. The protection from salt water and particulates afforded by internal placement of the compressor, and the cool internal temperatures of the operating environment extend the useful life of the air compressor and other components of the system.

Because the air compressor is located within the refrigerated space and the suction port is located outside the container, the ingested air is at a different temperature and humidity ratio then the conditioned space in which the compressor resides. This condition causes condensation to form in the suction line tubing, and the condensation is then drawn into the compressor to cause moisture related problems that reduce bearing and compressor ring life.

This problem is exacerbated by other design considerations. In order to prevent ring blow-by gases from altering container conditioned atmospheres, the applicants have adopted the practice of back venting the air compressor crank case gases into the suction ports. With reciprocating positive displacement compressors, this practice causes pressure pulsations inside the crank case, and these pressure fluctuations create a continuous flow of warm, and sometimes moist, air into the crankcase by way of the breather tube. A crank case condensation problem is encountered when the compressor is running at low discharge pressures, with a perishable set point, in moderately moist environments. Briefly stated, the heat generated by the fundamental compression and motor work is not sufficient to raise the aluminum crank case above the compressor suction dew points. Continuous running at these conditions causes moisture to collect and corrode on internal components. When the equipment is stored during the down season, this water causes corrosive damage to the compressor.

SUMMARY OF THE INVENTION

In accordance with one aspect of the invention, the compressor suction air temperature and dew point are reduced by employing a tube heat exchanger between the lower temperature container air and the compressor suction air inside the tube. The resulting reduction of suction air temperature tends to eliminate the problems encountered when compressor suction dew points exceed the crank case wall temperature.

In accordance with another aspect of the invention, provision is made to separate condensed liquids from compressor suction gas without adversely affecting compressor or system performance. This is accomplished by the use of a low restriction water separator system on the vacuum or suction side of the compressor system.

By yet another aspect of the invention, provision is made for draining the water separator sump by using a radial flowing bulkhead fitting. A phenomenon of vertical back spatter, is eliminated by the use of a plurality of radially extending draining ports and the impaction of liquid condensate with the accumulator wall.

In the drawings as hereinafter described, a preferred embodiment is depicted; however, various other modifications and alternate constructions can be made thereto without departing from the true spirit and scope of the invention.

DETAILED DESCRIPTION OF THE INVENTION

Figure 1:
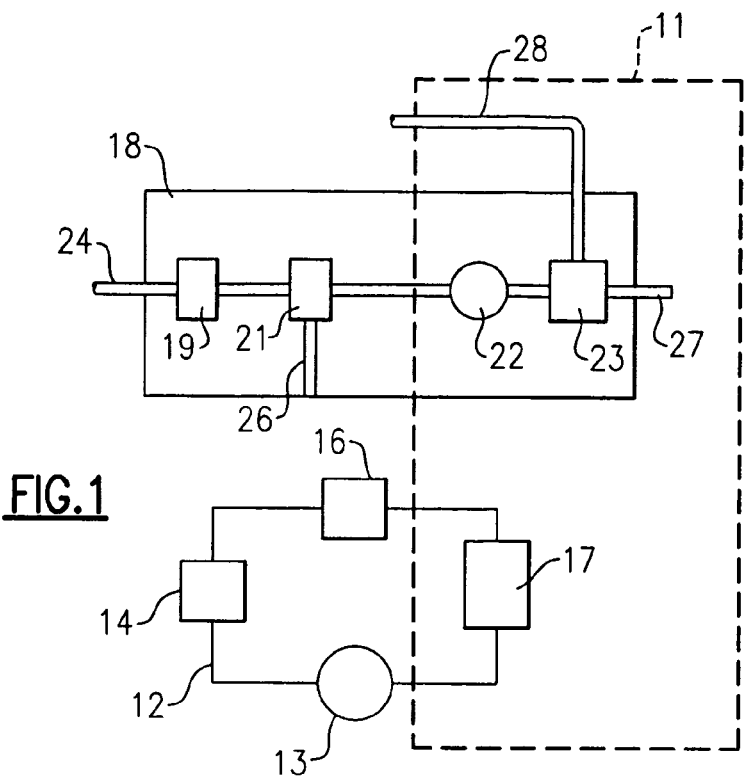
FIG. 1 is a schematic illustration of the present invention as incorporated into a refrigerated container system with a controlled atmosphere provisions.

Referring now to FIG. 1, there is shown a simplified schematic illustration of a refrigerated container system with the present invention incorporated therein. The container is outlined in dashed lines and is indicated generally at 11. A refrigerant compression circuit is shown at 12 and comprises a compressor 13, a condenser 14, an expansion device 16 and an evaporator 17, all interconnected in serial flow relationship, with the evaporator 17 being located within the container 11 for purposes of cooling the air therein. In this regard, it should be recognized that the refrigerant compression circuit 12 is different from an air conditioner which simply cools the air sufficiently to provide comfort to persons within a space but is rather designed as a system to refrigerate the container 11 to the extent necessary to preserve food such as in a refrigerator.

Shown at 18 is a controlled atmosphere system which operates to inject nitrogen rich gas into the container 11 for purposes of maintaining the cargo in a non-ripened condition. In operation, ambient air is brought into the inlet port 24 and is passed through the condensing line/heat exchanger 19 in a manner to be described hereinafter. As the air is cooled in the heat exchanger 19, the resulting condensate then passes to a water separator/accumulator 21 for removal of the condensate to ambient through the line 26. The drier air is then passed to the compressor 22 where it is compressed and passed to the gas separator 23 for separation of the oxygen from the nitrogen. The nitrogen rich gas passes into the container 11 by a line 27, and the oxygen rich gas is passed to ambient by way of a line 28. This portion of the system will be described more fully hereinafter.

Figure 2A:
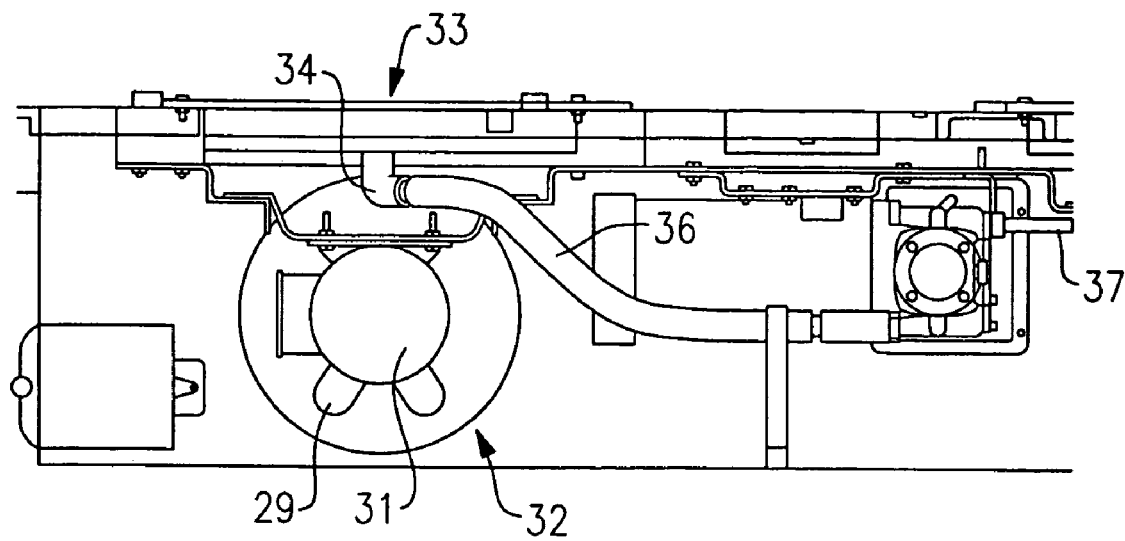
FIGS. 2A and 2B are top and side views, respectively, of portions of such systems in accordance with the prior art.
Figure 2B:
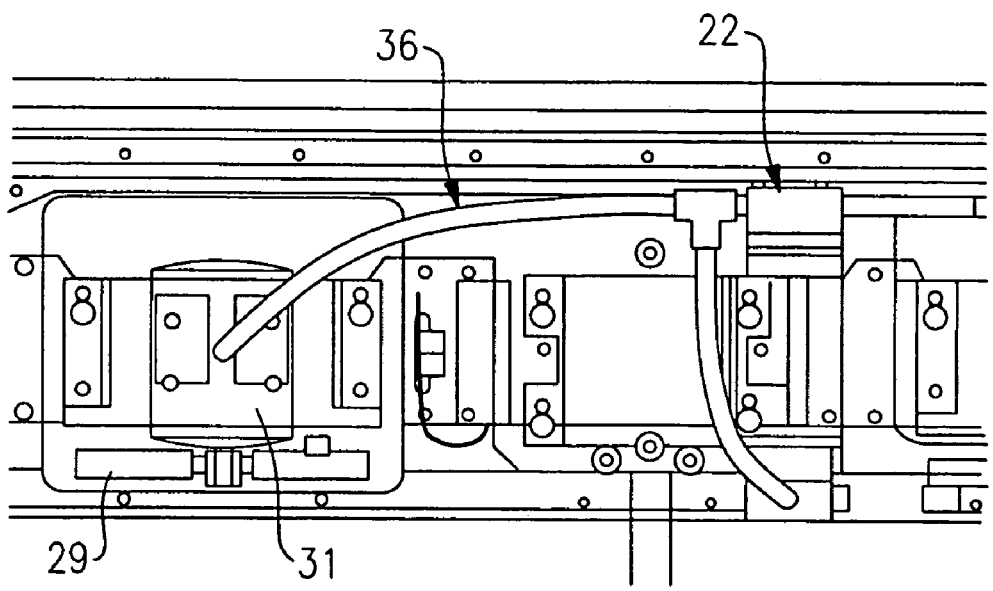

Referring now to FIGS. 2A and 2B, there is shown portions of a refrigerated container system with controlled atmosphere in accordance with the prior art. As part of the refrigerant compression circuit 12, the evaporator fan 29 and its drive motor 31 are shown as installed in such a position to circulate cooling air through the surrounding area 32. Its function is to circulate air to be cooled over the evaporator 17 (not shown in this view), and has little or no effect on the operation of the controlled atmosphere system 18.

As part of the controlled atmosphere system 18 an inlet panel/filter 33 is provided to filter the ambient air being drawn into the suction port 34, then into the suction line 36 to the air compressor 22. The ambient air is then compressed and passes along the discharge line 37 to the gas separator (not shown) as described hereinabove. A bypass tube connects the interior of the crank case with the inlet of the cylinders so that blow-by is returned from the crank case to the inlet of the cylinder for recirculation. This prevents ring blow-by gases from altering container conditioned atmospheres.

It has been found that with the above arrangement, condensation tends to form in the suction line 36 because of the differences in temperature and humidity ratio at ambient and in the conditioned space. The condensation is then drawn into the compressor and causes moisture problems as described hereinabove.

The above problem is acerbated by the fact that reciprocating positive displacement compressors cause pressure pulsations inside the crank case, and these pressure fluctuations create a continuous flow of warm and some times moist air into the crank case via the breather tube. A crank case condensation problem is encountered when the compressor is running at low discharge pressures, with a perishable set point, and moderately moist environments. Under these conditions, the heat generated by fundamental compression and motor work is not sufficient to raise the aluminum crank case above compressor suction dew points. Current controlled atmosphere compressor suction dew points are in excess of 70-75 F, depending on location in the world, while crank case wall temperatures average around 62-65° F. continuous running at these conditions cause moisture to collect and corrode on internal components. When equipment is stored during the down season, this water causes corrosive damage to the compressor.

Figure 3A:
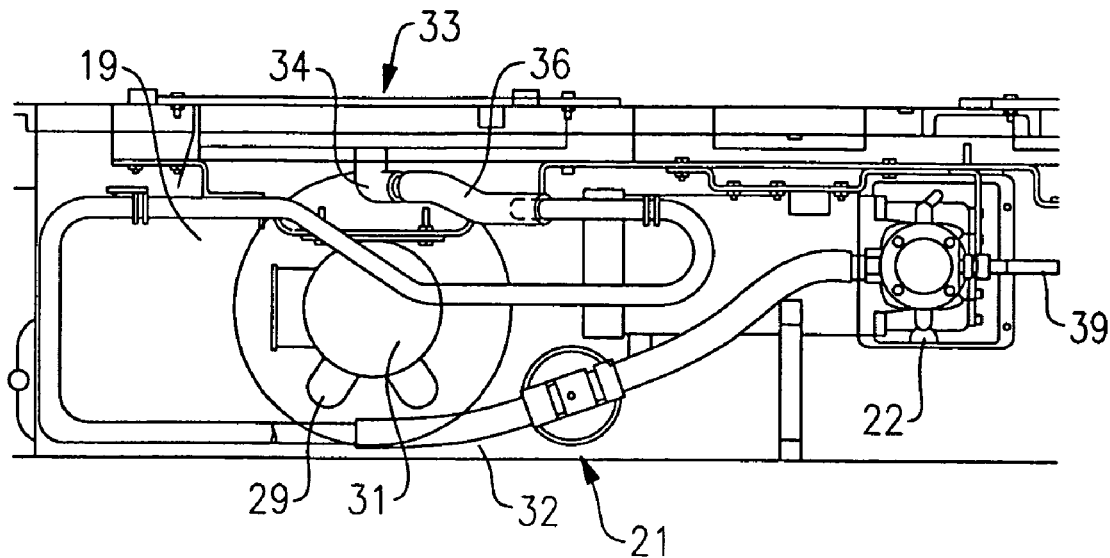
FIGS. 3A and 3B are top and side views, respectively, of portions thereof in accordance with a preferred embodiment of the invention.
Figure 3B:
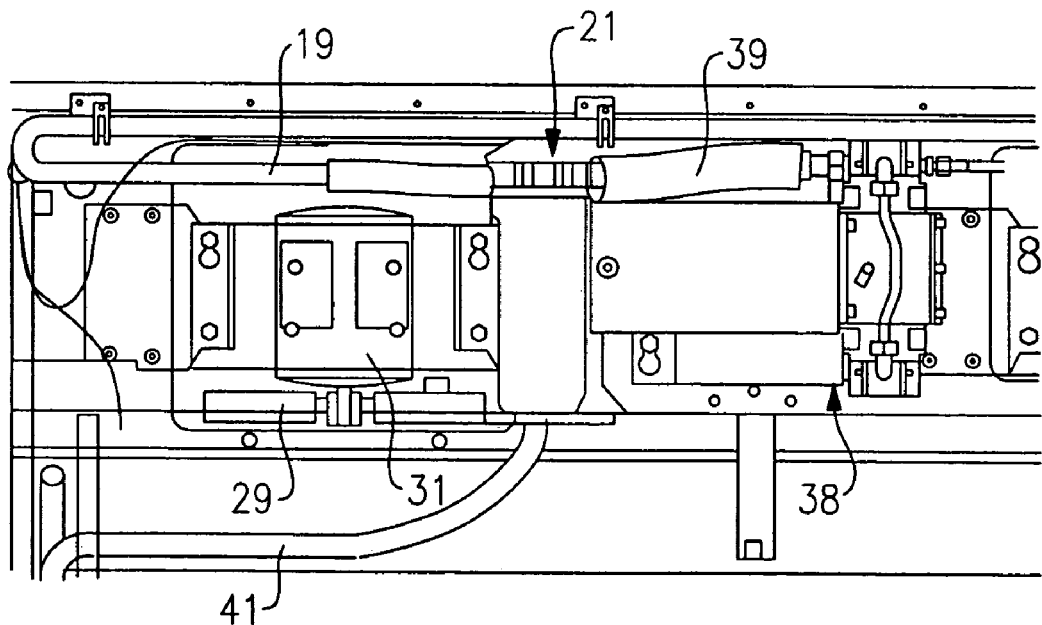

The above problems are overcome by the present invention as shown in FIGS. 3A and 3B. Rather than the suction line 36 passing directly to the compressor as in the prior art, a condensate line heat exchanger 19 is attached to the suction line 36 as shown and is routed so as to be substantially within the area 32 such that the air passing through the area 32 because of operation of the evaporator fan 29 passes over the condensing line heat exchanger 19 so as to cool the ambient air therein and cause some of it to condense.

At the downstream end of the heat exchanger 19, the water separator/accumulator 21 receives the air/condensate mixture and acts to separate the two, with the drier air then passing along an insulated tube 39 to the compressor 22, and the condensate passing along the line 41 to ambient. Such an arrangement not only removes moisture from the ambient air but also reduces the suction air temperature and thus eliminates the problem encountered when compressor suction dew points exceed the crank case wall temperature.

It should be recognized that the ambient air being drawn in will vary substantially with the environment. Thus, the present system must be designed to withstand such adverse conditions as is present in a marine salt air environment. Accordingly, the heat exchanger 19 is preferably treated internally such as with a conversion coating or a hard coat anodized process to render it substantially corrosion resistant. Further, such a coating also promotes a drop-wise condensation rather than a film condensation, thereby promoting more effective heat transfer. The length and shape of the heat exchanger 19 is designed to allow for easy assembly into the system.

Figure 4:
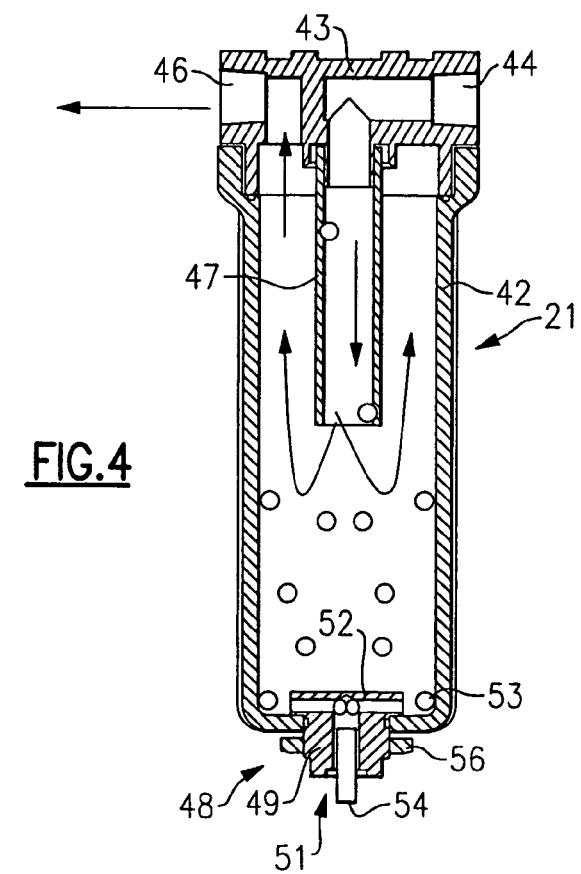
FIG. 4 is a sectional view of a water separator and drain fitting portion thereof in accordance with a preferred embodiment of the invention.

Referring now to FIG. 4, the water separator/accumulator 21 is shown to include an elongate cylindrical housing 42 disposed with its axis in a vertical orientation. A top member 43 closes the cylindrical housing 42 at its top and includes an inlet opening 44 for the admission of the air and water mixture, and a discharge opening 46 for discharging the relatively dry air to the compressor suction port. A centrally disposed drop tube 47 is connected to the top member 43 and provides fluid communication from the inlet opening 44 to the inner portion of the cylindrical housing 42. The length of the drop tube may vary, but it has been found that it should preferably reach about half way down the length of the housing 42. A drain fitting 48 is then provided to drain the condensate from the system.

In operation, the air and water mixture enters the inlet opening 44 and passes down through the relatively long drop tube 47 to enter the interior of the cylindrical housing 42 at its about midpoint. As the air/water enters the larger diameter housing 42, the flow area expands, and the flow velocity is reduced. This drop in velocity slows the momentum of the water droplets allowing them to fall from the tip of the suspended drop tube 47. Additionally, in order for the flow of air to rise up on the outer sides of the drop tube 47 as shown by the arrows and enter the discharge opening 46, the flow must change directions by 180 degrees. This forced flow direction change causes the momentum of the smaller entrain droplets to push out of the flow stream during its change in directional path. The inside diameter of the cylindrical housing 42 is such that it prevents droplets from being pulled up the wall by velocity pressure. In this way, a combination of volume expansion and the 180 degree change of direction of the gas flow accomplishes substantially 100% effective removal of the moisture from the ambient air.

It should be recognized that the above described system is a free flowing design with very little restriction in the flow of the air/water mixture on the vacuum or suction side of the compressor. This is to be contrasted with the existing pneumatic systems wherein water separators are used on the high pressure side of the system and therefore have an associated relatively high pressure drop which can impact compressor performance. The present system does not negatively impact compressor performance and doesn't require a media filter as a liquid impingement method, which would require repeated service for cleaning.

Another possible problem addressed by the present invention is that of back spattering, which can adversely affect performance. That is, since that water separator sump is in vacuum, a condition exists when the vacuum in the sump cause water from the drain to be pulled back into the separator sump. This cause back spattering which results in lower collection efficiencies. At times the back spattering can reach the top of the accumulator sump and carry over to the outlet port. This problem is addressed by the specific design of the drain fitting 48.

The drain fitting 48 comprises a cylindrical body 49 with a central opening 51. The cylindrical body 49 is secured in the bottom of the cylindrical housing 42 by brazing or the like and is relatively large in its outer diameter as compared with the inner diameter of the cylindrical housing 42 (i.e. about ½). At the top of the cylindrical body 49 is a flat top element 52 with a plurality of radially extending ports 53 as shown. It has been found that six radial ports 58 are satisfactory for this design. A trap 54 is disposed within the central opening 51.

In operation, the condensate that falls to the bottom of the cylindrical housing 42 flows radially inwardly through the ports 53 and flows downwardly through the central opening 51, from where it then passes to ambient as described hereinabove. The spattering effect is therefore eliminated because any condensate that tends to be drawn back into the housing 42 must first flow through one of the radial ports 53 and then is impacted against the inner diameter of the accumulator wall surrounding the ports 53.

The drain fitting 48 also includes a jam nut 56 which is used as the primary attachment of the accumulator to the fan deck of the system.

While the present invention has been particularly shown and described with reference to a preferred embodiment as illustrated in the drawings, it will be understood by those skilled in the art that various changes in detail may be affected therein without departing from the spirit and scope of the invention as defined by the claims.

We claim:

1. A corrosion prevention system for a refrigerated container having an air compressor located within a refrigerated space and having its suction port located outside the refrigerated space, comprising:
    an evaporator coil and associated fan for circulating air through an area;
    a heat exchanger fluidly interconnecting said suction port to conduct the flow of relatively warm suction air from said suction port toward the air compressor, said heat exchanger being primarily disposed within said area so that the suction air is caused to be cooled by the flow of circulated air from said fan whereby some of the suction air is cooled to the extent that a condensate is formed; and
    a water separator for removing the condensate from said heat exchanger, said water separator fluidly connected to said compressor to pass air thereto.

2. A corrosion prevention system as set forth in claim 1 wherein said water separator includes a drain fitting for draining condensate from said separator to ambient.

3. A corrosion prevention system as set forth in claim 1 wherein said water separator includes an elongate cylindrical housing with its axis orientated vertically.

4. A corrosion prevention system as set forth in claim 3 and further wherein said water separator includes a vertically orientated drop tube centrally disposed with respect to said cylindrical housing and fluidly interconnected to an inlet port at its top end to conduct the flow of air/water mixture downwardly into said cylindrical housing.

5. A corrosion prevention system as set forth in claim 4 wherein said drop tube extends substantially halfway down the length of said cylindrical housing.

6. A corrosion prevention system as set forth in claim 4 wherein said water separator includes at least one opening which fluidly connects a space surrounding said drop tube to a discharge opening.

7. A corrosion prevention system as set forth in claim 1 wherein said water separator includes a drain fitting at its lower end.

8. A corrosion prevention system as set forth in claim 7 wherein said drain fitting includes a central opening extending vertically downward and a plurality of radially extending ports which fluidly interconnect said central opening to a lower cavity defined by said cylindrical housing.

9. A method of preventing corrosion in an air compressor disposed within a refrigerated container having provision for maintaining a controlled atmosphere, comprising the steps of:
    providing an evaporator coil and associated fan for circulating air through an area;
    providing a suction port outside of said refrigerated container for injecting ambient air therein;
    providing a heat exchanger fluidly interconnecting said suction port to conduct the flow of relatively warm suction air from said suction port toward the air compressor, said heat exchanger being primarily disposed within said area so that the suction air is caused to be cooled by the flow of circulated air from said fan to the extent that a condensate is formed; and
    providing a water separator for removing the condensate from said heat exchanger and fluidly connecting said water separator to said compressor to pass air thereto.

10. A method as set forth in claim 9 and including the step of providing a drain fitting for draining condensate from said separator to ambient.

11. A method as set forth in claim 9 wherein said water separator includes an elongate cylindrical housing and including the step of orienting said housing with its axis vertical.

12. A method as set forth in claim 11 and further providing a vertically orientated drop tube centrally disposed with respect to said cylindrical housing and fluidly interconnecting it to an inlet port at its top end to conduct the flow of air/water mixture downwardly into said cylindrical housing.

13. A method as set forth in claim 12 and including the step of extending said drop tube substantially halfway down said cylindrical housing.

14. A method as set forth in claim 12 and including the step of including at least one opening in said separator to fluidly connect a space surrounding said drop tube to a discharge opening.

15. A method as set forth in claim 9 and including the step of providing a drain fitting at a lower end of said water separator.

16. A method as set forth in claim 15 and including the step of providing a drain fitting with a central opening extending vertically downwardly and a plurality of radially extending ports which fluidly interconnect said central opening to a lower cavity defined by said cylindrical housing.

* * * * *